(12) United States Patent
Wojtowicz et al.

(10) Patent No.: US 6,626,981 B2
(45) Date of Patent: Sep. 30, 2003

(54) MICROPOROUS CARBONS FOR GAS STORAGE

(75) Inventors: Marek A. Wojtowicz, Simsbury, CT (US); Michael A. Serio, Sturbridge, MA (US); Eric M. Suuberg, Barrington, RI (US)

(73) Assignee: Advanced Fuel Research, Inc., East Hartford, CT (US)

( * ) Notice: Subject to any disclaimer, the term of this patent is extended or adjusted under 35 U.S.C. 154(b) by 0 days.

(21) Appl. No.: 09/900,677

(22) Filed: Jul. 6, 2001

(65) Prior Publication Data
US 2002/0020292 A1 Feb. 21, 2002

Related U.S. Application Data
(60) Provisional application No. 60/216,643, filed on Jul. 7, 2000.

(51) Int. Cl.⁷ .............................. B01J 21/18; B01J 20/20
(52) U.S. Cl. .............................. 95/90; 95/900; 96/108; 502/419; 502/420; 502/526
(58) Field of Search .............................. 95/90, 116, 900, 95/903; 96/108; 206/7; 502/416, 418, 419, 420, 430, 432, 436, 526

(56) References Cited

U.S. PATENT DOCUMENTS

| | | | | |
|---|---|---|---|---|
| 4,580,404 A | * | 4/1986 | Pez et al. | 62/55.5 |
| 4,594,163 A | * | 6/1986 | Sutt, Jr. | 208/310 R |
| 5,240,474 A | * | 8/1993 | Auvil et al. | 95/138 |
| 5,461,023 A | * | 10/1995 | Chang et al. | 502/418 |
| 5,510,063 A | * | 4/1996 | Gadkaree et al. | 210/500.27 |
| 5,626,650 A | * | 5/1997 | Rodriguez et al. | 95/116 |
| 5,989,512 A | * | 11/1999 | Lynum et al. | 219/121.5 |
| 5,993,766 A | * | 11/1999 | Tom et al. | 206/7 |
| 6,113,673 A | * | 9/2000 | Loutfy et al. | 502/416 |
| 6,290,753 B1 | * | 9/2001 | Maeland et al. | 206/7 |
| 6,309,446 B1 | * | 10/2001 | Nakanoya et al. | 95/102 |

FOREIGN PATENT DOCUMENTS

WO   WO 97/07885   * 3/1997

* cited by examiner

*Primary Examiner*—Duane Smith
*Assistant Examiner*—Frank M. Lawrence
(74) *Attorney, Agent, or Firm*—Ira S. Dorman (57) ABSTRACT

A method for producing high capacity gas-storage microporous sorbents involves precursor carbonization under relatively severe heat-treatment conditions, normally followed by activation using a cyclic chemisorption-desorption process.

20 Claims, 6 Drawing Sheets

MICROPOROUS CARBONS FOR GAS STORAGE

CROSS-REFERENCE TO RELATED APPLICATION

This application claims the benefit of U.S. Provisional Application No. 60/216,643, filed Jul. 7, 2000 in the names of the inventors designated herein.

STATEMENT REGARDING GOVERNMENT INTEREST

The United States Government has rights in this invention under National Aeronautics and Space Administration contract No. NAS9-97012.

BACKGROUND OF THE INVENTION

In many energy-storage systems, the volume available for gas storage is restricted and, indeed, can be a limiting factor for a given technology. For example, the acceptance of natural gas as a transportation fuel has been slow mainly due to the lower energy density of that gas as compared with gasoline. The same is true regarding hydrogen and hydrocarbon gases (e.g., methane) for the use in spacecraft propulsion systems and fuel cells. The storage of hydrogen is certainly a critical barrier that needs to be overcome before fuel cells can be widely used in transportation applications. There exists therefore a strong need for the development of lightweight, compact, high energy density storage of gases for a variety of applications.

At present, there are two principal approaches to this problem: (a) physical storage (compressed gas, liquefaction, and adsorption); and (b) chemical storage (e.g., metal hydrides for hydrogen storage). The foregoing approaches have however the following limitations: Compressed gas systems have high weight-to-volume ratios due to the heavy containers required for the storage of pressurized gas. Vessels made from lightweight graphite composites show some promise in alleviating this difficulty, but further advancements and product development are required to assure safe and reliable use of these materials. Cryogenic storage carries with it significant penalties because of the energy required to liquefy the gas and to maintain it in a liquefied state. Metal hydrides, or other suitable chemicals, remain a possible option, but low-cost hydrides currently require high temperatures to liberate the stored hydrogen; moreover, the hydrides which are capable of liberating hydrogen at low temperatures have a very low storage capacity.

Gas storage based on adsorption on activated carbon offers large storage capacity in terms of weight (2–4 times greater than state-of-the-art hydrides). Activated carbons have a great potential to provide substantially larger storage capacities than gas compression because the density of the adsorbed phase is greater than gas density. The high density of gas at the surface more than compensates some loss of the available volume associated with the introduction of a sorbent. Commercial activated carbons have a serious limitation, however. A large portion of their porosity resides in mesopores (pore size, $d_p$=2–50 nm), whereas it is the microporosity ($d_p$<2 nm) that is most desirable for high storage capacity. This can be rationalized by the presence of stronger sorbent-adsorbate interactions within small pores. Thus, to maximize gas storage capacity it is necessary to develop a method of fabricating highly microporous carbons.

A key to successful gas-storage sorbents is the ability to "engineer" the pore structure in such a way so that only pores having optimum dimensions are formed. The optimum dimension will, generally speaking, be different for different gases, but the common features of good gas-storage sorbents are: (1) a large number of pores with a narrow pore-size distribution within the micropore region (pores smaller than 2 nm); (2) the absence of meso and macroporosity (pores larger that 2 nm); and (3) minimization of void space within the storage container (consistent with the form of the sorbent employed).

In general, it is difficult to satisfy all the above criteria simultaneously. A significant challenge is often associated with increasing the specific surface area of carbon (by char activation) in such a way so that pores of uniform size are formed throughout the entire volume of a large, monolithic sorbent element (e.g., a disc-like element having a minimum dimension that is on the order of one centimeter). Char activation is usually carried out by reacting carbon with an oxidizing agent, typically steam or carbon dioxide, but the use of oxygen is also possible. During the activation of large sorbent elements, pores close to the surface of the sorbent react with the oxidizing agent before the pores inside the sorbent have a chance to interact with the oxidizing agent. In other words, diffusion of the activating agent through the porous medium is slower than the rate of reaction between the gas molecules and carbon. As a consequence, the parts of the pores that are close to the surface react preferentially and get enlarged, whereas the porosity deeper within the sorbent remains underdeveloped. This leads to the non-uniform evolution of porosity and pore-mouth widening, which are highly undesirable for gas-storage sorbents.

In an effort to resolve the above problem, an innovative char-activation process was developed (Quinn and Holland, U.S. Pat. No. 5,071,820, 1991; Wójtowicz, M. A., Smith, W. W., Serio, M. A., Simons, G. A., and Fuller, W. D., "Microporous carbons for gas-storage applications," Proc. Twenty-Third Biennial Conference on Carbon, the Pennsylvania State University, Jul. 13–18, 1997, vol. I, pp. 342–343; Wójtowicz, M. A., Markowitz, B. L., Smith, W. W. and Serio, M. A., "Microporous carbon adsorbents for hydrogen storage," International Journal of the Society of Materials Engineering for Resources 7 (2), 253–266, 1999). The technique is called cyclic chemisorption-desorption activation and involves cyclic repetition of the following two steps: (1) oxygen chemisorption on carbon surface at a relatively low temperature $T_{ch}$ for a period of $\tau_{ch}$ to form stable oxygen surface complexes; and (2) high-temperature ($T_d$) desorption of the surface complexes as carbon monoxide, which is carried out in the absence of oxygen. The desorption step is carried out for a period $\tau_d$. Both the low temperature of the chemisorption step and the inert atmosphere of the desorption step prevent excessive burn-off and the creation of larger-size pores via pore-mouth enlargement. In each chemisorption step, this method allows deep penetration of the oxidizing agent into the farthest and smallest pores, without the preferential burn-off of the carbon material at the pore mouth.

SUMMARY OF THE INVENTION

The broad objects of the invention are to provide a novel method for the preparation of sorbents for the high energy density storage of gases, particularly hydrogen; to provide novel sorbents so produced; and to provide novel gas storage units employing such sorbents.

More specific objects are to provide such a method, sorbent and unit wherein the sorbent constitutes a highly microporous carbon element having an improved pore structure and gas adsorption capacity.

It has now been found that certain of the foregoing and related objects of the invention are attained by the provision of a method for gas storage, and particularly for the storage of hydrogen, comprising the steps: (a) effecting carbonization of a carbonaceous precursor material in a substantially nonoxidizing atmosphere at temperatures that attain an upper value ($T_f$) of at least about 1000° C. and for a residence (hold) time ($\tau_f$) of determined duration at that temperature (which may be momentary); and (b) introducing the gas to be stored, under positive pressure, into a storage vessel containing a substantial amount of the sorbent material so produced. It is believed that a substantial amount of the carbon content of the precursor material is converted to a graphitic form in the carbonization step.

In certain embodiments, the upper value of temperature attained in the carbonization step will be at least about 1100° C., and the carbonization step may advantageously be effected by maintaining the precursor material in the nonoxidizing atmosphere, and at the upper temperature value attained, for a period of at least about one minute and, under certain circumstances, preferably about 30 minutes. The process for producing the sorbent material will preferably include at least one activation step effected subsequent to the carbonization step, which activation step will advantageously comprise multiple cycles of chemisorption and desorption.

Other objects of the invention are attained by the provision of a sorbent material produced in the manner described, and still other objects are attained by the provision a gas storage unit comprising: a vessel; a substantial quantity of the described sorbent material contained in the vessel; and a quantity of gas adsorbed by the sorbent material. To obtain optimal storage capacity, the gas will advantageously be introduced into the storage vessel at a pressure in the range of about 500 psi to 3500 psi, and the vessel will contain at least about 75 percent of the sorbent, based upon its volumetric capacity.

DETAILED DESCRIPTION OF THE PREFERRED EMBODIMENTS

In accordance with the present invention, severe heat treatment (thermal annealing) during carbonization is shown to result in an increased sample crystallinity and in a micropore structure that favors gas-storage enhancement. A gas-storage capacity of nearly 7 g $H_2$ per 100 g carbon was obtained for one sorbent.

Somewhat less severe conditions can be employed to good effect, but it is believed that the precursor must attain a temperature of at least about 1000° C. during carbonization to afford the desired improvement in storage capacity. Similarly, although a hold period of about one minute, and more typically at least about 30 minutes, at the attained temperature has been found to be effective, simply reaching the indicated minimum temperature, and only momentarily holding the material thereat, will often suffice. It will be appreciated that the conditions of carbonization will usually be optimized by correlating the upper temperature value to a hold time period; i.e., the higher the temperature value the less significant a hold time will be.

Although the invention is not to be limited by a particular theory of operation, it is believed that subjecting the carbonaceous precursor to severe heat conditions during carbonization promotes conversion of a substantial portion of the carbon content to graphitic form, which provides (particularly after activation) pores of optimal character for gas (especially hydrogen) storage. Generally, an amount of graphitic carbon that is measurable by X-ray diffraction, as described hereinbelow, will be deemed substantial.

An optimum degree of burn-off was also determined for a series of sorbent discs. It was found that for each gas-storage pressure there exists a burn-off at which gas-storage capacity, on a per-unit-weight basis, reaches maximum. For example, there was no benefit associated with sorbent activation beyond ~18% burn-off for a hydrogen storage pressure of 255 psi. For higher storage pressures, this burn-off limit was found to exceed 35%. With regard to the storage capacity on a per-unit-volume basis, an optimum burn-off was found to be about 10–20% and did not depend strongly on storage pressure. The above results provide useful guidelines for the design of gas-storage sorbents to meet specific requirements.

A description of the sorbent-preparation technique used, as well as the results of hydrogen-sorption tests, are given below.

Material

Polyvinylidene chloride (PVDC) was employed as a precursor for sorbent preparation. Other natural and synthetic materials (e.g., phenol-formaldehyde resins, polyfurfuryl alcohol, coconut and peanut shells, peach pits, olive stones, etc.) can be used, but PVDC is particularly suitable as it forms little or no mesoporosity upon carbonization (pyrolysis).

Carbonization of PVDC Monoliths (Discs)

Monolithic (shaped) sorbents are desirable for gas storage so that the excessive packed-bed voidage is reduced from ~40% (spheres of identical size) down to nearly zero in the case of carefully arranged, shaped sorbent elements. Nevertheless, it should be appreciated that powders and other particulate forms of carbonaceous materials are also suitable for use in practicing the invention.

To study the mechanical and sorption properties of large-size carbon sorbents, a number of discs were prepared by pressing the original polyvinylidene chloride (PVDC) powder in a press operated with a force of one ton and ten tons. All resulting discs were approximately 10 mm in diameter and 5 mm thick. The objective was to determine the feasibility of carbonizing and activating centimeter-size discs that would eventually become a highly effective gas-storage sorbent, it being necessary to establish conditions under which the discs could be carbonized without causing excessive swelling and foaming of the sorbent material.

The following pyrolysis regime was found favorable for the structural integrity of PVDC discs:.
(1) Heat at 5° C./min to 170° C.
(2) Heat at 0.1° C./min to 230° C.
(3) Heat at 2° C./min to the final temperature, $T_f$
(4) Hold at $T_f$ for time $\tau_f$
(5) Cool down at ~22° C./min to room temperature $T_f$=850–1100° C. and $\tau_f$=1–240 min were used. Step (2) is highly significant from the standpoint of gas evolution which, under the above conditions, occurs slowly in the temperature range 170–230° C. It will be appreciated by those skilled in the art that heating rates lower than the ones specified in steps (1)–(3) can be successfully implemented, and that one or more temperature hold periods can be effected as part of steps (1)–(3).

Figure 1:
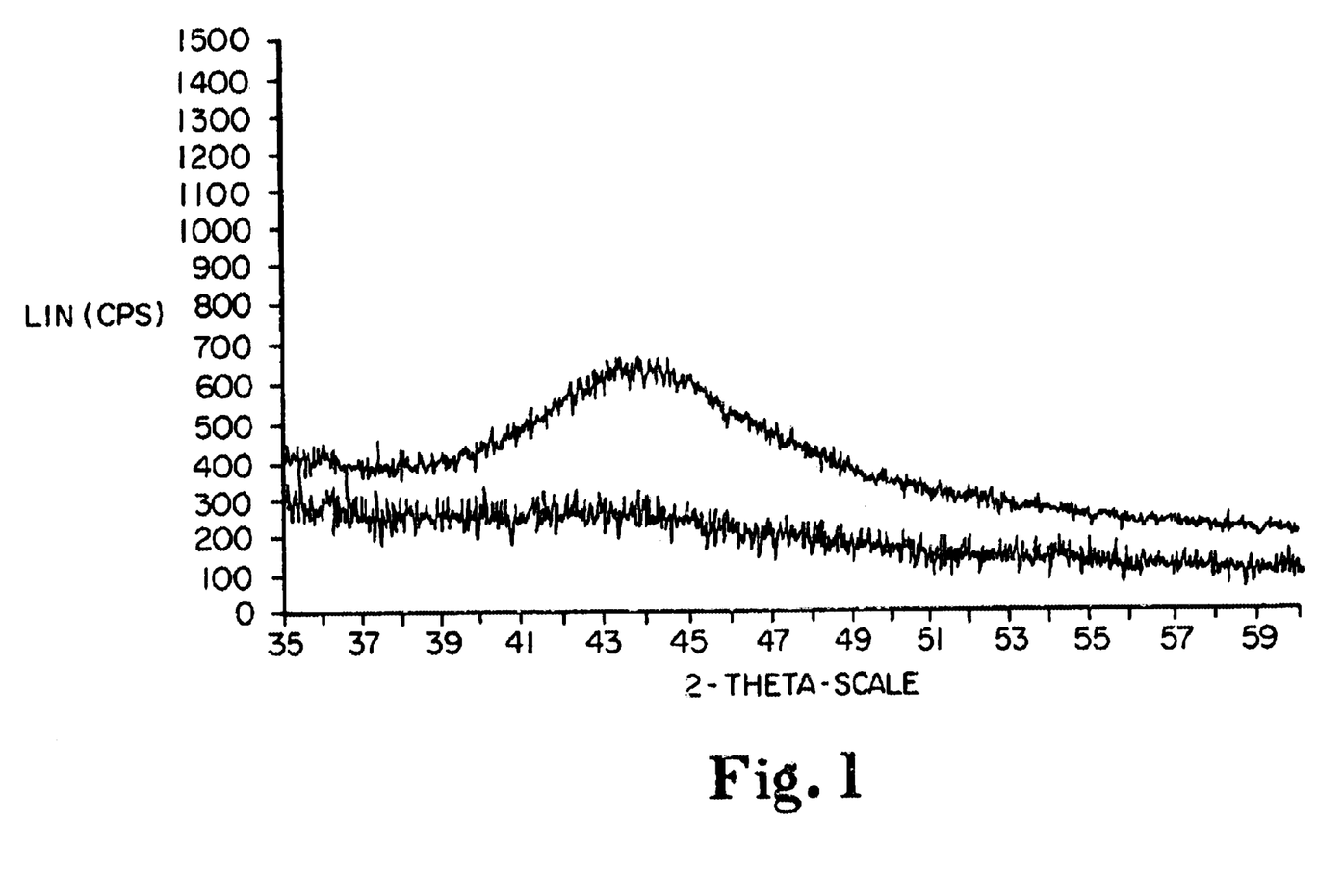
FIG. 1 is a graph presenting X-ray diffraction data for PVDC chars prepared at 900° C. (bottom spectrum—$T_f$=900° C.; $\tau_f$=5 min; 0% burn-off) and 1100° C. (top spectrum—$T_f$=1100° C.; $\tau_f$=30 min; 0% burn-off)

Differences in heat treatment lead to dramatic differences in char microstructure, and ultimately in gas-storage performance. As discussed below, the sorbent synthesized under severe conditions (e.g., $T_f$=1100° C. and $\tau_f$=30 min) showed a markedly better performance than sorbents prepared under milder conditions ($T_f$=900° C. and $\tau_f$=5 min). To shed light on the structural differences between such sorbents, samples of PVDC chars carbonized at 900° C. and 1100° C. were subjected to X-ray diffraction analysis using a Bruker X5005 diffractometer. Each of the samples showed features in two regions, with a more intense peak in the range $2\theta$=40°–50°, and a weaker one located at $2\theta$=75°–85°. When the diffraction patterns were compared on the same scale, the peak region for the PVDC carbonized at 1100° C. was found to have greater intensity and definition (see FIG. 1). This indicates that the sample prepared at the higher temperature is more crystalline (i.e., graphitic) in nature, and the implications of this finding for gas-storage capacity are discussed below.

Char Activation

The cyclic chemisorption-desorption method was used with $T_{ch}$=150–250° C., $\tau_{ch}$=15 min–50 hrs, $T_d$=800–1,000° C., and $\tau_d$=1 min–2 hrs. Sorbent weight loss (burn-off) was controlled by adjusting the number of chemisorption-desorption cycles.

Hydrogen-storage Capacity on a Per-unit-weight Basis

Figure 2:
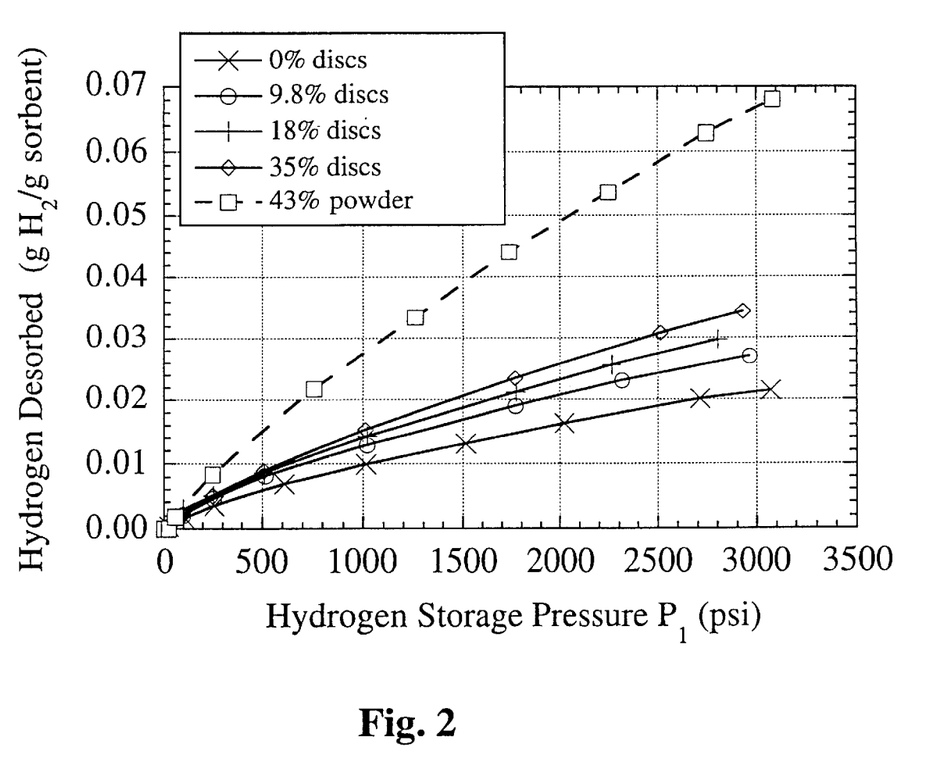
FIG. 2 is a graph showing hydrogen desorption isotherms for PVDC-derived carbon discs at several burn-offs. The 43% burn-off data are for a sorbent that was carbonized and activated under high-severity conditions: $T_f$=1100° C.; $\tau_f$=30 min; air activation; $T_{ch}$=200° C., $T_{ch}$=15 min; $T_d$=950° C., $T_d$=1 min. The conditions for other sorbents' preparation were: $T_f$=930° C.; $\tau_f$=15 min; air activation; $T_{ch}$=200° C., $\tau_{ch}$=90 min; $T_d$=850° C., $\tau_d$=60 min.

Hydrogen desorption isotherms at room temperature (~295–300 K) are shown in FIG. 2 for several sorbents having different burn-off. Desorption rather than adsorption isotherms were chosen for this analysis because the amount of gas that can be put into a tank is usually much less important than the amount of gas available from the tank. A description of the testing apparatus and procedure can be found in Hynek, S., Fuller, W. and Bentley, *J. Int. J. Hydrogen Energy* 22 (6), 601–610, 1997.

Data in FIG. 2 show that the hydrogen-storage capacity increases with the increasing storage pressure, and also with the increasing degree of sorbent burn-off. A hydrogen-desorption isotherm for the more-severely heat-treated carbon is shown for comparison (dashed line). It is clear that this sorbent has dramatically superior properties, which are believed to be attributable to the differences in the micropore structure of the carbonized material, which are in turn attributable to the carbonization conditions employed. These conclusions are supported by the structural differences found in chars heat-treated at different temperatures, as discussed above.

It is to be noted that the BET surface area of the 43% burn-off carbon is lower (1,600 $m^2/g$) than the surface area of most of the other sorbents (1,588–2,366 $m^2/g$), as determined by a nitrogen adsorption technique. Although severe heat-treatment conditions during carbonization, as described herein, do not necessarily bring about an increase in BET surface area and micropore volume, therefore, they may nevertheless result in enhanced hydrogen-storage capacity on a per-unit-weight basis. Evidently, the complex hydrogen-carbon interactions within Angstrom-size pores may not be reflected in the nitrogen-adsorption data that form the basis of the BET and Dubinin-Radushkevich analyses. Thus, it is seen that the BET surface area and Dubinin-Radushkevich micropore volume cannot necessarily be relied upon to predict the performance of a given sorbent as a gas storage medium.

It is believed that the ordering of graphitic planes, associated with thermal annealing of carbon, has important implications for gas storage. Again, while the invention is not to be limited by any theory of operation, it is suggested that gas (especially hydrogen) molecules achieve extremely high storage densities in interplanar spaces by causing the dimensions of these spaces to be such that they maximize hydrogen-carbon interactions, Hydrogen-storage Capacity on a Per-unit-volume Basis A meaningful way of comparing the capacity of different sorbents, on a volume basis, is by means of the so-called usable capacity ratio (UCR), defined as the mass ratio of gas available from a sorbent-filled tank to the gas available from an empty tank of the same volume. (The term "empty tank" refers to the tank containing no sorbent, i.e., a tank filled only with the compressed gas.) UCR is, therefore, a measure of the advantage resulting from the use of sorbent over the storage of compressed gas in an empty tank. To best warrant using a sorbent system, the value of UCR should be maximized; a storage system with a UCR less than unity will not normally be employed.

For a given temperature, the experimental value of UCR depends on the initial and final gas pressure: $P_1$ and $P_2$, respectively, wherein $P_1$ is the maximum working pressure of a tank and $P_2$ is the minimum discharge pressure of the system employing the tank. In hydrogen-sorption experiments carried out in accordance herewith, the effect of delivery rates entered the measurement as the actual time in which a given amount of hydrogen was vented from the container. In other words, only the readily desorbing amount of hydrogen was measured.

In general, the advantage of carbon adsorbent over compressed gas is expected to be greatest at relatively low pressures. Under such conditions, the enhanced gas density at the carbon surface, due to the gas-surface interactions (adsorption), gives the carbon-filled container an appreciable advantage over the relatively low-density storage in an empty tank. This situation corresponds to a high value of UCR. As the storage pressure increases, the advantage provided by the sorbent decreases as the gas density in an empty tank increases with pressure, whereas the density of adsorbed gas is less sensitive to pressure. In addition, the storage volume lost in the vessel due to the presence of solid carbon (sorbent) has a more detrimental effect at high pressures. As a result, UCR decreases with increasing storage pressure, and at some point it reaches a value of unity. The pressure at which this occurs is different for different sorbents, as discussed in Hynek et al. (*J. Int. J. Hydrogen Energy* 22 (6), 601–610, 1997) and in *Multi-Fuel Reformers for Fuel Cells Used in Transportation: Assessment of Hydrogen Storage Technologies*, Phase I and II reports prepared for U.S. Dept. of Energy, Contract No. DE-AC02-92-CE50343, Arthur D. Little, Inc., 1994 (Ph. I) and 1995 (Ph. II). At pressures above this significant value, the presence of sorbent in the storage vessel offers no advantage over compressed gas. At still higher pressures, liquid hydrogen (for example) offers the storage density that cannot be matched by either carbon adsorption or gas compression systems.

Finally, although the usable capacity ratio decreases with gas pressure, the absolute amount of gas stored in the storage vessel increases. It is thus concluded that adsorption-based systems offer best advantages over compressed gas in applications where high pressures and cryogenic conditions ought to be avoided. It is often a matter of judgment, based on specific-application requirements, to decide at which pressure a given gas should be stored in an adsorption-based system. The trade-off is usually between the advantage over compressed gas (i.e., UCR), the absolute value of gas-storage density required, and the weight of the storage system.

Figure 3:
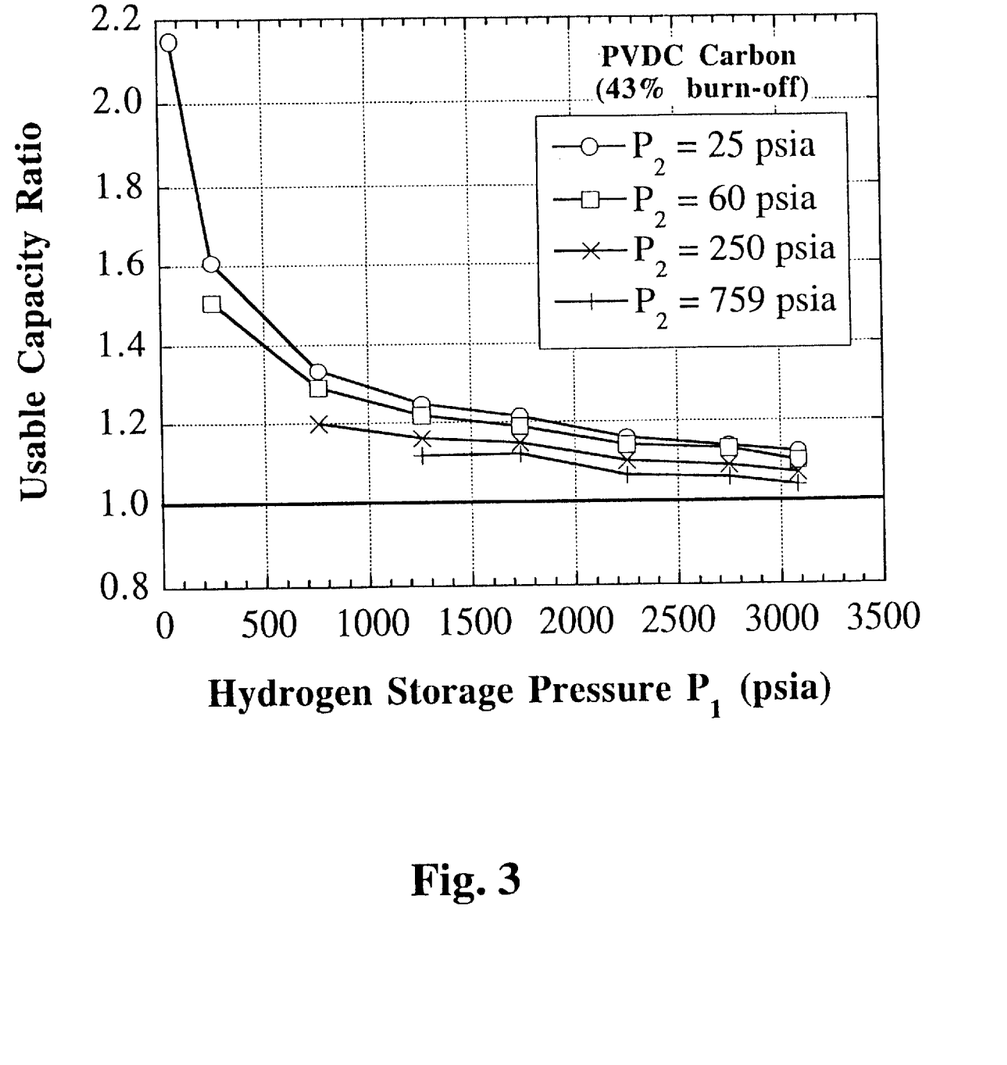
FIG. 3 is a graph showing the usable capacity ratio at T=300 K for a PVDC carbon sorbent (43% burn-off), correlated to storage pressure. Carbonization was effected, in accordance with the present invention, under high-severity conditions: $T_f$=1100° C.; $\tau_{ch}$=30 min; air, $T_{ch}$=200° C., $\tau_{ch}$=15 min; $T_d$=950° C., $\tau_d$=1 min.

Data in FIG. 3 indicate that good volume-based gas storage performance is preserved at higher burn-offs for PVDC sorbents prepared using the technique described herein. Data in Hynek et al. (*J. Int. J. Hydrogen Energy* 22 (6), 601–610, 1997) and in *Multi-Fuel Reformers for Fuel Cells Used in Transportation: Assessment of Hydrogen Storage Technologies*, Phase I and II reports prepared for U.S. Dept. of Energy, Contract No. DE-AC02-92-CE50343, Arthur D. Little, Inc., 1994 (Ph. I) and 1995 (Ph. II, show that, for many sorbents, UCR drops below unity at pressures substantially lower than 3,000 psi.

Performance of a Hydrogen-Storage System

Data presented in FIG. 2 and FIG. 3 were used to prepare plots of hydrogen-storage capacity and usable capacity ratio versus carbon burn-off. The results are shown in FIG. 4 and FIG. 5.

Figure 4:
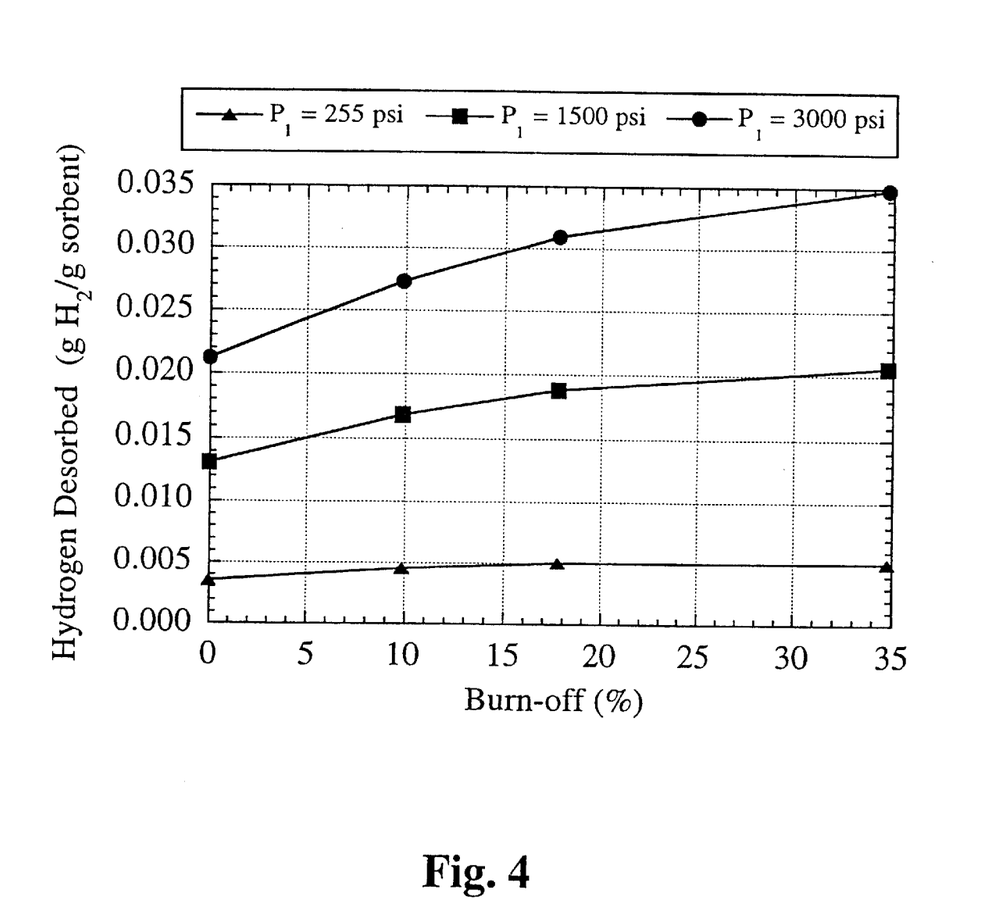
FIG. 4 is a graph showing hydrogen desorption isotherms for carbon discs at several burn-offs and several storage pressures, $P_1$. The sorbent carbonization and activation conditions were as follows: $T_f$=930° C.; $\tau_f$=15 min; air, $T_{ch}$=200° C., $\tau_{ch}$=90 min; $T_d$=850° C., $\tau_d$=60 min.

For low-severity sorbents tested at 3000 psi, data in FIG. 4 demonstrate hydrogen-storage capacities of up to 3.5 g $H_2$ per 100 g sorbent. The high-severity sorbent, on the other hand, showed a dramatically increased value of nearly 7 g $H_2$ per 100 g sorbent (FIG. 2), which compares very favorably with a long-term goal set by the U.S. Department of Energy for hydrogen storage on carbon sorbents. The target value for future vehicular applications is 6 wt % of stored hydrogen, which translates to 6.38 g $H_2$ per 100 g sorbent.

Data in FIG. 4 provide a good insight into the importance of sorbent burn-off. As can be seen, hydrogen-storage capacity on a unit weight basis increases with increasing burn-off, but the rate of increase declines at higher burn-offs. Thus, for each gas-storage pressure there exists a burn-off at which gas-storage capacity reaches maximum. For example, data in FIG. 4 indicate that, from this standpoint, there would be no benefit associated with sorbent activation beyond ~18% burn-off for a storage pressure of $P_1$=255 psi. For higher storage pressures, this maximum value of burn-off is correspondingly increased. Although the available data do not enable exact values of an optimum burn-off to be determined for $P_1$=1500 psi or $P_1$=3000 psi, nevertheless the data in FIG. 4 show that, in these cases, char activation adds value to sorbent performance for burn-offs of up to at least 35%.

Figure 5:
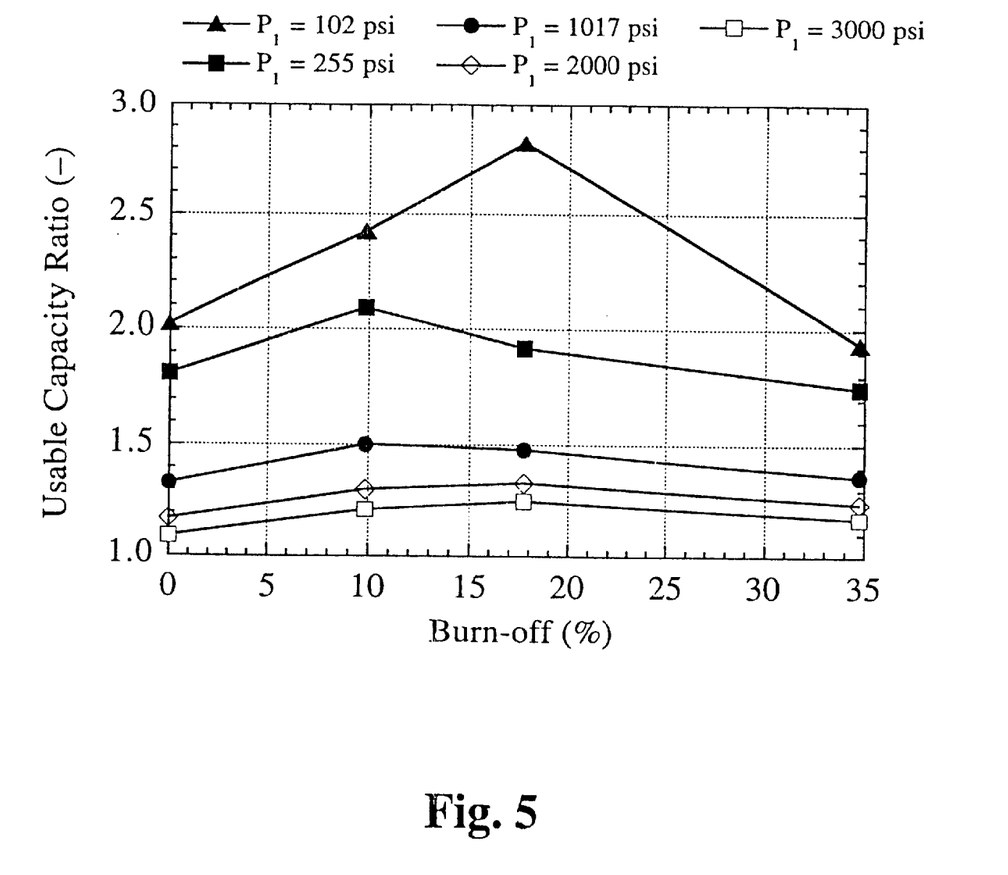
FIG. 5 is a graph showing the usable capacity ratio at T=300 K for carbon sorbent discs prepared at several burn-offs and several storage pressures, $P_1$, assuming a venting pressure of 19–26 psi. The sorbent carbonization and activation conditions were as follows: $T_f$=930° C.; $\tau_f$=15 min; air, $T_{ch}$=200° C., $\tau_{ch}$=90 min; $T_d$=850° C., $\tau_d$=60 min.

Data in FIG. 5 reveal that sorbents developed in accordance herewith provide a storage capacity exceeding that of a pressurized hydrogen tank by 9–182% (UCR=1.09–2.82). The exact magnitude of this advantage depends on sorbent burn-off and the storage pressure used. With regard to the volume-based storage capacity, the use of the present sorbents constitutes a significant improvement in the performance of a storage system for pressures up to at least 3,000 psi. An optimum burn-off, at which the usable capacity ratio is maximum, is not strongly dependent on storage pressure $P_1$, and is in the range 10–20%.

The analysis of data in FIG. 4 and FIG. 5 leads to the conclusion that sorbent activation beyond ~20% burn-off offers little advantage for systems in which volume-based performance is critical. In such cases, the selection of a good carbon precursor, favorable carbonization conditions, and a modest burn-off level is of great importance, whereas more extensive sorbent activation may be desirable where overall weight should be minimized.

Figure 6:
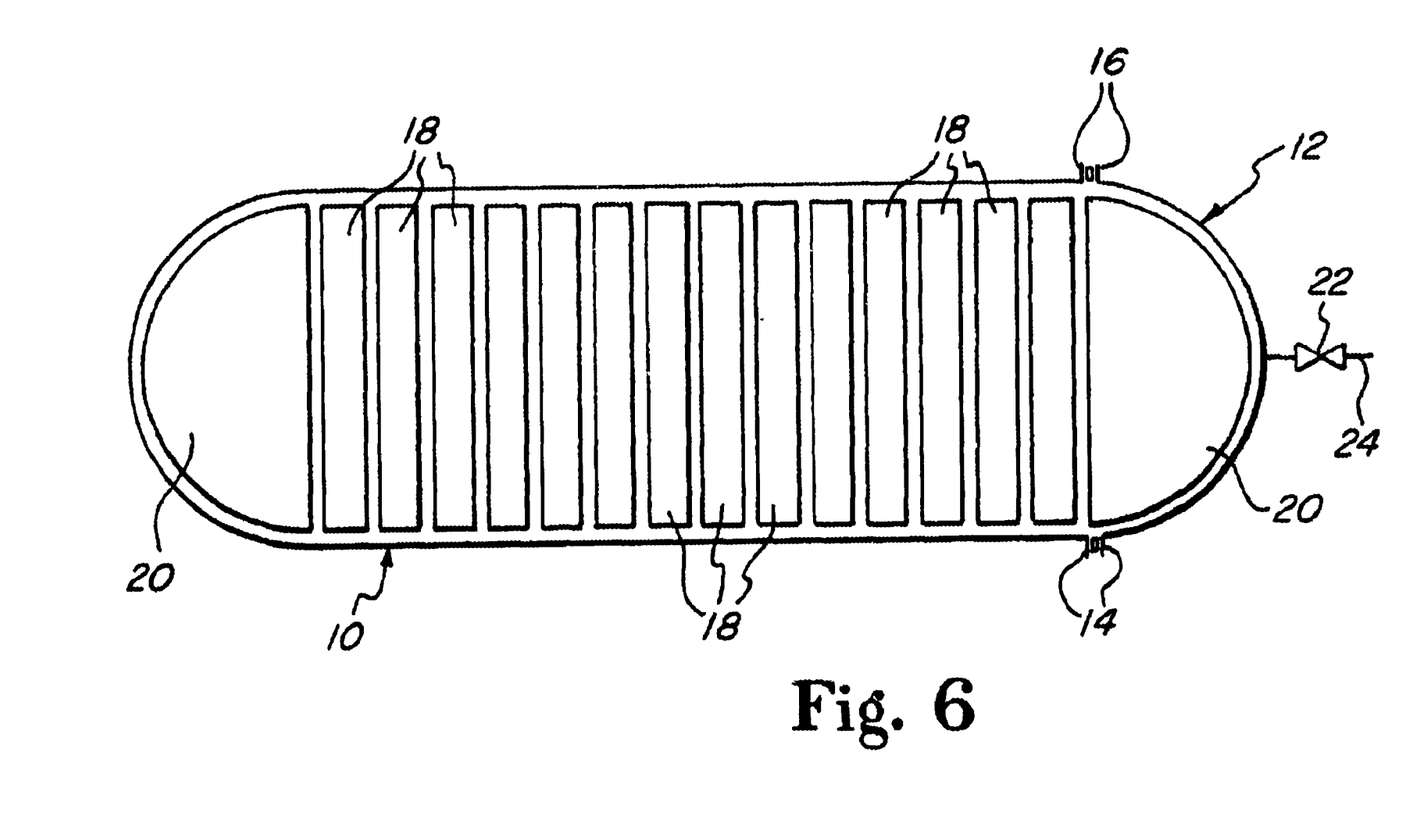
FIG. 6 is a diagrammatic representation of a gas-storage system embodying the invention.

The gas storage unit of FIG. 6 consists of a high-pressure vessel having a cylindrical body and a hemispherical head, generally designated by the numerals 10 and 12, respectively, the circumferential flanges 14 of which are bolted to one another with a sealing gasket 16 interposed therebetween. The vessel contains a stack of disc-like sorbent elements 18, and hemispherical sorbent elements 20 at the opposite ends of the stack, the elements 18, 20 having been produced in the manner described herein and embodying the invention. A valve 22 controls flow through the line 24, to close the vessel and to permit the introduction and removal of gas thereunto and therefrom. Gas entering and exiting from the vessel flows between and about the elements 18, 20, it being appreciated that the spacing therebetween and thereabout is exaggerated for illustrative purposes.

Thus it can be seen that the present invention provides a novel method for the preparation of sorbents for the high energy density storage of gases, particularly hydrogen, and it provides novel sorbents and novel gas storage units employing them. More specifically, the sorbent constitutes highly microporous carbon elements having an improved pore structure and gas-adsorption capacity.

Having thus described the invention what is claimed is:

1. A method for gas storage, comprising the steps:
    (a) effecting carbonization of a solid carbonaceous precursor material by heat treating said precursor material in a substantially nonoxidizing atmosphere and at temperatures that attain an upper value of at least about 1100°, to thereby produce substantial microporosity and graphitization of the carbon of said precursor material and provide a sorbent material; and
    (b) introducing a gas to be stored, under positive pressure, into a storage vessel containing a substantial amount of said sorbent material.

2. The method of claim 1 wherein said carbonization step is effected by maintaining said precursor material in said atmosphere and at said upper temperature value for a hold period of at least about one minute.

3. The method of claim 2 wherein said hold period is at least about 30 minutes.

4. The method of claim 1 wherein said process for producing said sorbent material includes at least one activation step effected subsequent to said carbonization step.

5. The method of claim 4 wherein said at least one activation step comprises multiple cycles of chemisorption and desorption.

6. The method of claim 1 said gas is introduced into said storage vessel at a pressure in the range of about 500 psi to 3500 psi.

7. The method of claim 1 wherein said sorbent material occupies at least about 75 percent of the volume defined within said vessel.

8. The method of claim 1 wherein said gas is selected from hydrogen and methane.

9. A sorbent material, adapted for gas storage, produced by effecting carbonization of a solid carbonaceous precursor material by heat treating said precursor material in a substantially nonoxidizing atmosphere and at temperatures that attain an upper value of at least about 1100° C., to thereby produce substantial microporosity and graphitization of the carbon of said precursor material.

10. The sorbent material of claim 9 wherein said carbonization step is effected by maintaining said precursor material in said atmosphere and at said upper temperature value for a hold period of at least about one minute.

11. The sorbent material of claim 10 wherein said hold period is at least about 30 minutes.

12. The sorbent material of claim 9 wherein said process for producing said sorbent material includes at least one activation step effected subsequent to said carbonization step.

13. The sorbent material of claim 12 wherein said at least one activation step comprises multiple cycles of chemisorption and desorption.

14. A gas storage unit comprising:

a vessel;

a substantial quantity of sorbent material contained in said vessel; and a quantity of gas adsorbed by said sorbent material in said vessel, said sorbent material having been produced by effecting carbonization of a solid carbonaceous precursor material by heat treating said precursor material in a substantially nonoxidizing atmosphere and at temperatures that attain an upper value of at least about 1100° C., to thereby produce substantial microporosity and graphitization of the carbon of said precursor material.

15. The storage unit of claim 14 wherein said carbonization step is effected by maintaining said precursor material in said atmosphere and at said upper temperature value for a hold period of at least about one minute.

16. The storage unit of claim 15 if wherein said hold period is about 30 minutes.

17. The storage unit of claim 14 wherein said process for producing said sorbet material includes at least one activation step effected subsequent to said carbonization step.

18. The storage unit of claim 17 wherein said at least one activation step comprises multiple cycles of chemisorption and desorption.

19. The storage unit of claim 14 wherein said gas is introduced into said storage vessel at a pressure in the range of about 500 psi to 3500 psi.

20. The storage unit of claim 14 wherein said gas is selected from hydrogen and methane, and wherein said sorbent material occupies at least about 75 percent of the volume defined within said vessel.

* * * * *

UNITED STATES PATENT AND TRADEMARK OFFICE
CERTIFICATE OF CORRECTION

PATENT NO. : 6,626,981 B2
DATED : September 30, 2003
INVENTOR(S) : Marek A. Wójtowicz, Michael A. Serio and Eric M. Suuberg It is certified that error appears in the above-identified patent and that said Letters Patent is hereby corrected as shown below:

<u>Title page,</u>
Items [12] and [75], add the diacritical mark to correct the spelling of the inventor's last name, which is -- Wójtowicz --.

<u>Column 10,</u>
Line 21, after the number "15" delete the word "if".

Signed and Sealed this

Thirtieth Day of December, 2003

JAMES E. ROGAN
*Director of the United States Patent and Trademark Office*